United States Patent
Eatedali et al.

(10) Patent No.: US 11,014,007 B2
(45) Date of Patent: May 25, 2021

(54) METHODS AND SYSTEMS FOR VIDEO GAME STREAMING TRANSACTION SUPPORT

(71) Applicants: Josiah Eatedali, Los Angeles, CA (US); Jon Estanislao, South Pasadena, CA (US)

(72) Inventors: Josiah Eatedali, Los Angeles, CA (US); Jon Estanislao, South Pasadena, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/584,509

(22) Filed: Sep. 26, 2019

(65) Prior Publication Data

US 2020/0197814 A1    Jun. 25, 2020

Related U.S. Application Data

(60) Provisional application No. 62/782,216, filed on Dec. 19, 2018.

(51) Int. Cl.
*A63F 13/355* (2014.01)
*A63F 13/77* (2014.01)
*A63F 13/35* (2014.01)
*A63F 13/358* (2014.01)

(52) U.S. Cl.
CPC .............. *A63F 13/77* (2014.09); *A63F 13/35* (2014.09); *A63F 13/355* (2014.09); *A63F 13/358* (2014.09); *A63F 2300/552* (2013.01)

(58) Field of Classification Search
None
See application file for complete search history.

(56) References Cited

U.S. PATENT DOCUMENTS

| | | | | |
|---|---|---|---|---|
| 2010/0016081 | A1* | 1/2010 | Prochnow | A63F 13/352 463/42 |
| 2015/0321098 | A1* | 11/2015 | van der Laan | H04N 21/6405 463/31 |

* cited by examiner

*Primary Examiner* — Damon J Pierce
(74) *Attorney, Agent, or Firm* — Klein, O'Neill & Singh, LLP (57) ABSTRACT

A transactional web page for procurement of a downloadable video game may provide for checking of whether a game device meets system specification requirements for play of the downloadable video game. Game devices that do not meet such system specification requirements, but that do meet requirements for play of a streaming version of the video, may be provided an option for play of the streaming version of the video game.

12 Claims, 5 Drawing Sheets

METHODS AND SYSTEMS FOR VIDEO GAME STREAMING TRANSACTION SUPPORT

CROSS REFERENCE TO RELATED APPLICATION

This application claims the benefit of the filing date of U.S. Provisional Patent Application No. 62/782,216, filed on Dec. 19, 2018, the disclosure of which is incorporated by reference herein.

BACKGROUND OF THE INVENTION

The present invention relates generally to video games, and more particularly to qualification of game devices for receiving video game content.

Video games provide fun and enjoyment for many. Video games allow users to participate in a variety of simulated activities. Video games allow game players, using computer devices, to perform roles and experience activities that the game players may not be able or desire to experience directly, whether due to cost, danger, or equipment concerns, or simply due to a role or activity being a fantasy. In providing simulated activities, video games may present a game player a simple display with simple and captivating interactions, or allow a game player to immerse him or herself in a richly detailed and extensive virtual world populated by a cast of characters. Some video games may therefore utilize little amounts of data for game play, with little in the way or processing and presentation. Other video games may utilize large amounts of data in providing for game play, data that may be extensively processed and preferably presented using advanced computer capabilities.

The computer devices used to play video games may also vary. These computer devices may include game devices in the types of game consoles, personal computers, tablet computer, smart phones and the like. These game devices may vary widely in terms of the presence, configuration, and state of utilization of hardware and software present on the device. Moreover, these game devices may vary widely in capabilities not only across device types, but also within device types, and even for the nominally same device based on device use by a user.

Different video games may therefore have potentially markedly different requirements as to device capabilities. Similarly, different devices, even with the same device type, or even nominally the same device, may have markedly different capabilities.

BRIEF SUMMARY OF THE INVENTION

Some embodiments in accordance with aspects of the invention provide for checking whether capabilities and/or configuration of a game device are sufficient for play of a downloadable version of a video game prior to allowing for downloading of the downloadable version of a video game to the game device. Some such embodiments may additionally determine whether the game device has sufficient capabilities and/or a configuration sufficient for play of a streaming version of the video game, and provide an option for streaming play of the video game, if the game device cannot provide for play of the downloadable version of the video game.

Some embodiments in accordance with aspects of the invention provide a method, performed at least in part by a server, of making an appropriate version of a video game available for play using a game device, comprising: receiving a request for a transactional web page for procurement of a downloadable version of the video game; providing information of the transactional web page for procurement of the downloadable version of the video game to the game device, the transactional web page for procurement of the downloadable version of the video game including a script for interrogation of the game device system specifications; receiving results of execution of the script on the game device; responsive to receiving the results, comparing the results of execution of the script with predetermined system requirements for execution of the downloadable video game; determining that the comparison of the results of execution of the script and the predetermined system requirements indicates the game device is not suitable for play of the downloadable version of the video game; and in response to at least determining that the comparison of the results of execution of the script and the predetermined system requirements indicates the game device is not suitable for play of the downloadable version of the video game, providing, to the game device, an option to engage in play of a streaming version of the video game.

In some such embodiments, the option to engage in play of the streaming version of the video game comprises a combined option to procure a right to engage in play of the streaming version of the video game and to begin streaming play of the streaming version of the video game. Some such embodiments further comprise determining that the comparison of the results of execution of the script and the predetermined system requirements indicates the game device is suitable for play of the streaming version of the video game. In some such embodiments provision, to the game device, of the option to engage in play of the streaming version of the video game is additionally in response to at least determining that the comparison of the results of execution of the script and the predetermined system requirements indicates the game device is suitable for play of the streaming version of the video game. Some embodiments further comprise providing, to the game device, a notification that the game device is not suitable for play of the downloadable version of the video game. In some embodiments the predetermined system requirements include operating system requirements, processor requirements, memory requirements, and application programming interface requirements. In some such requirements the predetermined system requirements specify a plurality of items which meet a particular first one of the predetermined system requirements and a minimum value which must be met or exceeded to meet a particular second one of the predetermined system requirements.

Some embodiments in accordance with aspects of the invention provide a server coupled to a network, the server for providing an appropriate version of a video game available for play using a game device, the server comprising: at least one processor, the at least one processor configured by program instructions to: provide information of a transactional web page for procurement of a downloadable version of the video game to the game device in response to receipt of a request for the transactional web page for procurement of the downloadable version of the video game, provide, to the game device, a script for use in interrogation of the game device system specifications, compare results of execution of the script with predetermined system requirements for execution of the downloadable video game, determine whether the comparison of the results of execution of the script and the predetermined system requirements indicates the game device is or is not suitable for play of the downloadable version of the video game, and provide, to the game device, an option to engage in play of a streaming version of the video game in the event that the comparison of the results of execution of the script and the predetermined system requirements indicates the game device is not suitable for play of the downloadable version of the video game.

In some such embodiments the processor is configured by program instructions to provide the script to the game device as part of providing the information of the transactional web page for procurement of the downloadable version of the video game to the game device. In some such embodiments the information of the transactional web page for procurement of the downloadable version of the video game includes an option to request checking whether the game device meets predetermined system requirements for play of the downloadable version of the video game.

These and other aspects of the invention are more fully comprehended upon review of this disclosure.

DETAILED DESCRIPTION

Figure 1:
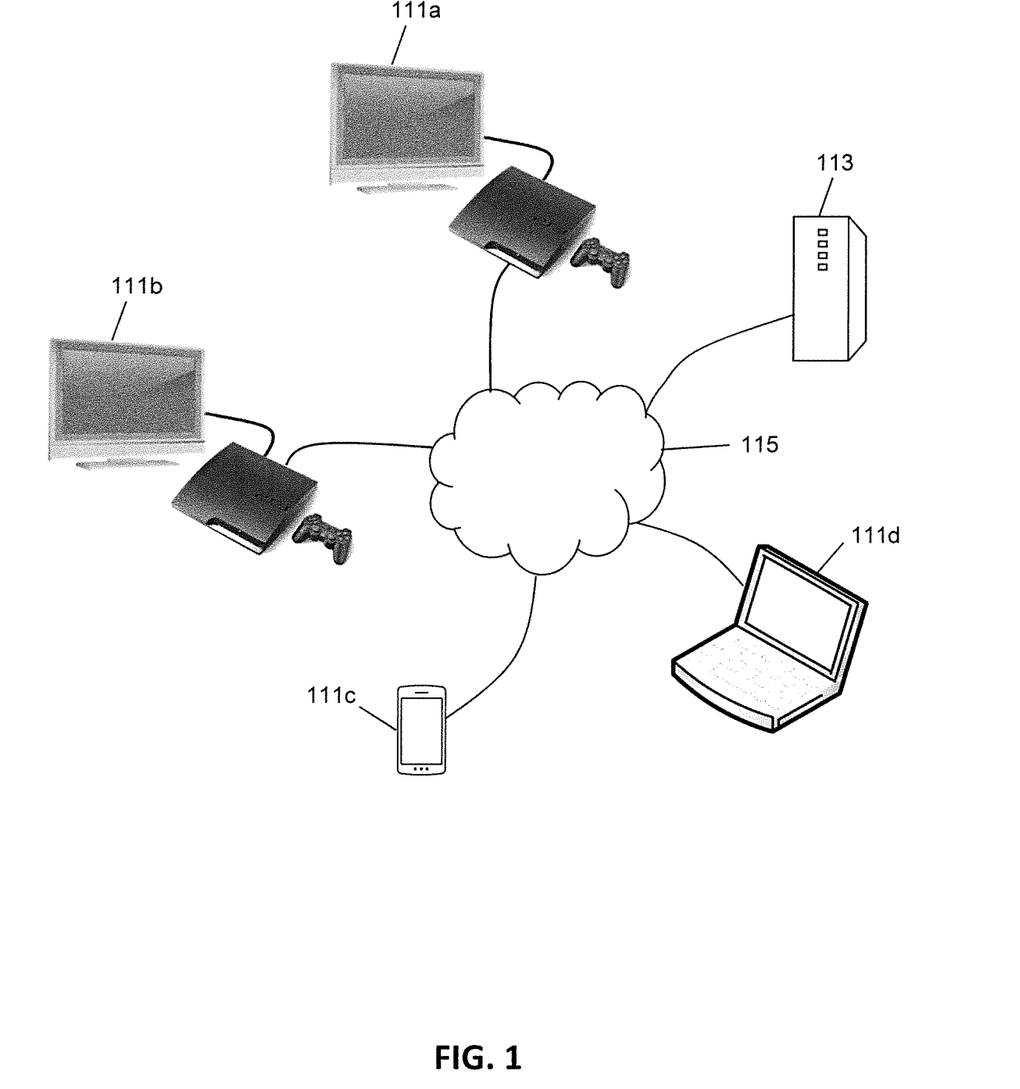
FIG. 1 illustrates a networked video game system in accordance with aspects of the invention.

FIG. 1 is a semi-block diagram of a system in accordance with aspects of the invention. The system includes a plurality of game devices 111a-d coupled to each other and a server 113 over a network 115, which may be for example the Internet. The game devices, and the server, may be considered compute devices. In some embodiments the server provides a web-based store for purchase and download of video games. In some embodiments the server also provides for play of multiplayer downloadable video games, and may be considered a game server. In some embodiments the server may also provide for play of streaming video games. In some embodiments the server may be a plurality of servers, and in such embodiments separate servers may be provided for the web-based store, the play of multiplayer downloadable video games, and the plays of streaming video games.

The server generally includes one or more processors configured by program instructions. The program instructions include program instructions for providing, over the network, transactional web pages or app store pages for use in allowing play of video games to the game devices. The transactional web pages or app store pages may allow for downloading of downloadable video games to the game devices and/or allow for streaming play of video games by the game devices. The program instructions also include program instructions for use in interrogating the game devices as to the capabilities and/or configuration of the game devices. In some embodiments the program instructions may be program instructions for providing one or more scripts or commands to the game devices, such that system specifications of the game devices may be determined. In some embodiments the server is configured to provide for downloading of a downloadable video game by a particular game device if that particular game device meets predetermined system requirements for play of the downloadable video game. In some embodiments the server is configured to provide an option for the game device to play a streaming version of the video game if the particular game device does not meet the predetermined system requirements for play of the downloadable video game, and in some embodiments to the exclusion of allowing for download of the downloadable video game. Of course, in some embodiments the server may be configured to provide the option for the game device to play the streaming version of the video game even if the particular game device does meet the predetermined system requirements for play of the downloadable video game, in some embodiments in addition to allowing downloading of the downloadable video game. In some embodiments, the server may be configured to provide a message to the user of the game device stating which method (e.g., downloading the game or streaming the game) is preferred based on the game device's specifications and/or a message further explaining possible benefits and drawbacks of the indicated preferred method. For example, the server may inform the user of certain game features, which may relate to audiovisual quality, smoothness of gameplay, or other aspects in some embodiments, that may only be available through the streaming method, but that the streaming method may require a stable Internet connection or an Internet connection of a particular quality.

The game devices 111a and 111b are shown as including a game console having at least one processor, a game controller, and a display. The game device 111c is shown as a smartphone, including at least one processor, a display device, and a touchscreen. The game device 111d is shown as a personal computer, of the laptop type in FIG. 1. More generally, in various embodiments the game devices may instead or in addition comprise a personal computer, a tablet computer, a smart phone, and/or some other compute device, each configured for video game play. In addition, for purposes of illustration, only a small number of game devices are shown in FIG. 1, in most embodiments the number of game devices may be over a thousand, and may be an order of magnitude or orders of magnitude greater than that. In some embodiments, however, the game devices may only consist of game consoles.

The game devices are configured, or configurable, for play of a video game, for example a single player and/or multi-player video game and/or a streaming video game. In some embodiments the game devices may be configured, or configurable, for play of some video games, but not other video games. The game devices generally include one or more processors, on-board memory in the form of RAM or similar memory for use by the processors during execution of program instructions, disk or similar memory, and sound and video hardware. The processors generally operate in accordance with an operating system of the game device, which generally allow for execution of program instructions for various applications, include video games, and make use of application programming interfaces (API) in doing so. Execution of particular video games may, depending on the video game, make use of particular features of the operating system or APIs, and may therefore require presence of particular operating systems or APIs, or may have various requirements for any of the attributes of the game devices.

In operation, in some embodiments the server may provide a transactional web page to a game device, upon request. The transactional web page may provide for completion of a transaction that results in download of a particular video game to the game device. In various embodiments the transactional web page also provides a script, or a request for a script, which may be executed by the game device to allow the game device or the server to determine whether the game device meets predetermined system requirements for download and/or play of the video game by the game device. In some embodiments the script may be in the form of one or more commands which, when executed by the game device, provides information as to the system specifications and/or status of the game device (which for convenience may be simply termed system specifications). For example, the information as to the system specifications and/or status may indicate a processor of the game device, memory available to the processor of the game device, free hard disk memory (or similar memory) of the game device, APIs of the game device, sound and video capabilities of the game device, and possibly other features and/or attributes of the game device. In some embodiments indications of the predetermined system requirements may also be provided by the server to the game device, such that the game device may determine whether the game device meets the predetermined system requirements and inform the server of the results of the determination. In some embodiments the script may include commands to send the system specifications to the server, with the server determining if the game device meets the predetermined system requirements. In some embodiments two sets of predetermined system requirements may be considered, one for download and play of the downloadable version of the video game and one for play of a streaming version of the video game. In some embodiments the server provides the game device an option to play the streaming version of the video game if the system specifications of the game device do not meet or exceed the system specifications for download and play of the downloadable video game. In some embodiments this option is not provided if the system specifications of the game device do not meet or exceed the system specifications for play of the streaming version of the video game.

During play of the video game, a game player utilizes the game controller or other input devices of a game device to control actions of a game character associated with the game player. The game character, responsive to commands provided by the game controller, is in and interacts with a virtual world and its other inhabitants, some of whom may be game characters controlled by other game players and some of whom may be game characters controlled by the video game itself. In some embodiments the game devices are configured to provide information regarding whether game play is occurring, and/or status of game play, to the game server. In some embodiments, for example in multiplayer video games, the game server may receive information regarding game play status from the game devices, with the game server distributing the game play status to the various game devices. In some embodiments the game server may instead receive requests for game character actions from the game devices, with the game server determining game play status and distributing information regarding game play status to the game devices.

Figure 2A:
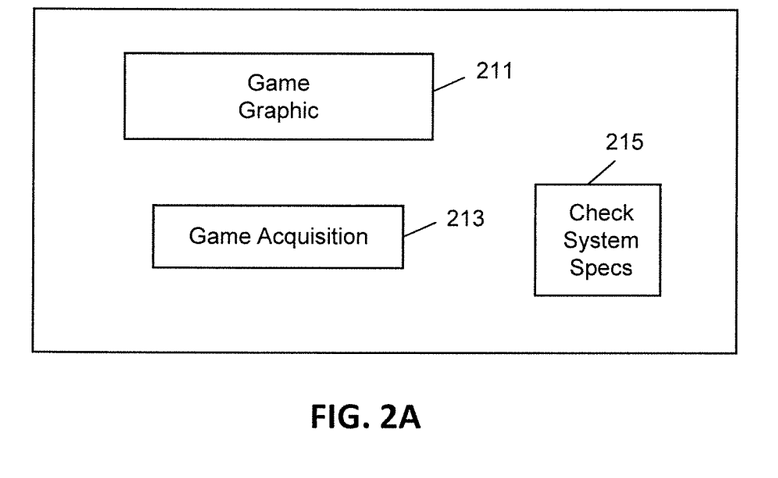
FIGS. 2A and 2B diagrammatically illustrate displays of user interfaces for procuring use of a video game, in accordance with aspects of the invention.

FIG. 2A diagrammatically illustrates a display of an example transactional web page for procurement of a downloadable video game, in accordance with aspects of the invention. The display of the web page may be displayed, for example, on a display screen of a game device. The game device is generally configured for play of video games. The game device may be, in various embodiments a game console with associated display device, a personal computer or laptop computer, a tablet computer device, or a smartphone. In general, the game device includes one or more processors, a display device, and user input devices, either as part of the game device or coupled to the game device.

The web page includes a game graphic 211, which may graphically indicate a particular video game, and a game acquisition button 213, selection of which may cause a download to the game device of the video game. The web page of FIG. 2A also includes a check system specifications button 215.

Selection of the check system specifications button generally results in the system specifications of the game device being checked to determine if the system specifications meet or exceed predetermined requirements for play of the video game on the game device. In some embodiments the selection of the check system specifications button causes execution by the processor of one or more commands that provide information regarding the system specifications of the game device. In some embodiments the commands, which may be considered a script, may be for example provided with information of the web page. In some embodiments the executed commands also include commands for the processor of the game device to compare the system specifications with the predetermined system specifications for play of the downloadable video game, which may also be provided with information of the web page. In some embodiments the information regarding the system specifications may be provided to a server, which may compare the system specifications with the predetermined system specifications for play of the downloadable video game. In some embodiments, however, the check system specifications button may not be provided, with the web page instead automatically providing for check of the game device system specifications.

Figure 2B:
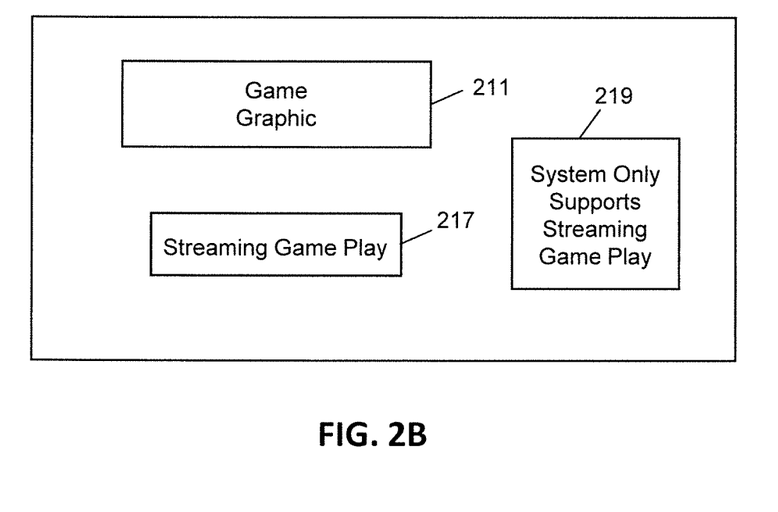

FIG. 2B diagrammatically illustrates a display of an example transactional web page for allowing for play of a streaming version of the video game, in accordance with aspects of the invention. The display of the web page of FIG. 2B may be on the same display of the game device of FIG. 2A, and may be displayed as a result of or in response to the check of the system requirements of the game device indicating that the game device does not have sufficient capability for play of the downloadable version of the video game. In some embodiments the web page of FIG. 2B may only be displayed if the check of the system requirements of the game device indicates the game device has sufficient capability for play of the streaming version of the video game.

The web page of FIG. 2B includes the game graphic 211, indicating the video game. The web page of FIG. 2B also includes a streaming game play button 217, selection of which allows for game play of a streaming version of the video game. The streaming game play button may be provided instead of a button allowing for download of the video game, or, in some embodiments, in addition to a button allowing for download of the video game. The web page also includes a notice 219 indicating that the game device does not support play of the downloadable version of the video game, but instead supports game play of a streaming version of the video game.

Figure 3:
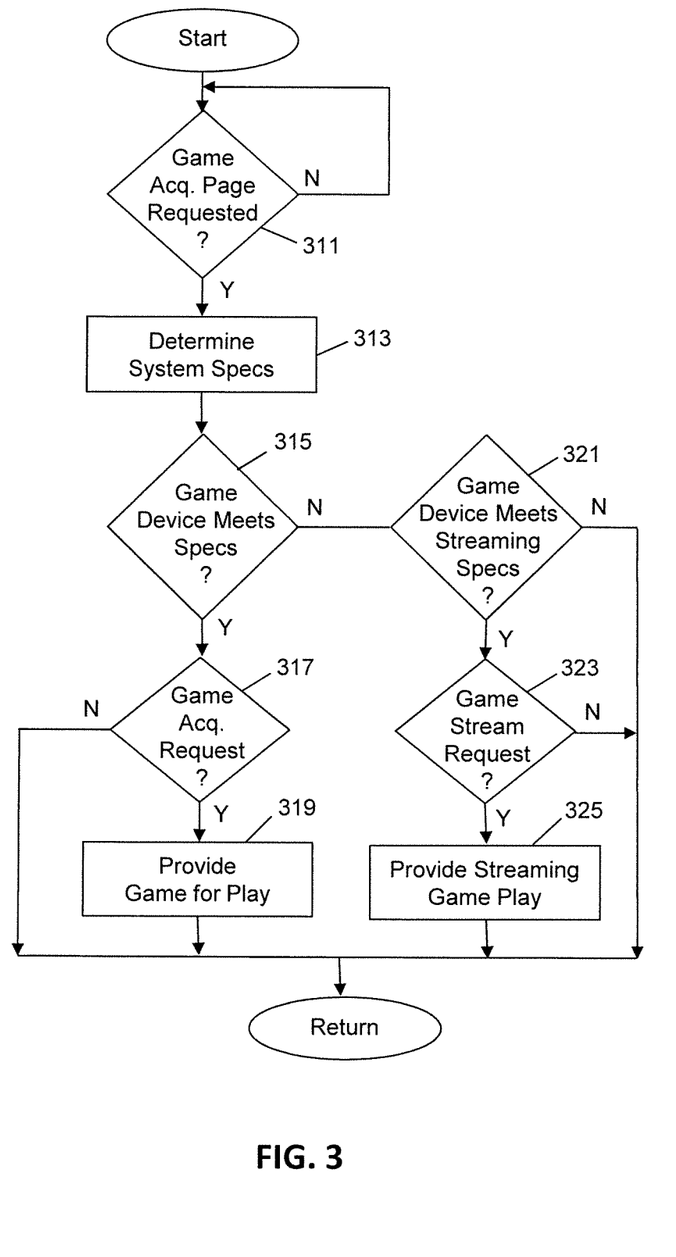
FIG. 3 is a flow diagram of a process for appropriately providing a video game to a game device based on game device capabilities, in accordance with aspects of the invention.

FIG. 3 is a flow diagram of a process for appropriately providing a video game to a game device based on game device capabilities, in accordance with aspects of the invention. In some embodiments the process is performed by a system, such as the system of FIG. 1. In some embodiments the process, or part of the process, is performed by a server, for example the server of FIG. 1. In some embodiments the process is performed by a server and a game device, for example the server of FIG. 1 and one of the game devices of FIG. 1. In some embodiments the process is performed by one or more processors, for example configured by program instructions.

In block 311 the process determines if a transactional web page for procurement of a downloadable video game has been requested. In some embodiments the request is made to a server by a game device, with the request transmitted over the Internet, for example. In some embodiments the transactional web page for procurement of the downloadable video game is a web page by which a game player may procure, for example by purchase and download, a video game to play on the game device. In some embodiments the server makes the web page available to game devices as part of providing a web-based store. If the transactional web page has been requested the process continues to block 313.

In block 313 the process determines system specifications of the game device. In some embodiments the process determines the system specifications by executing commands on the game device that provide system specification information. In some embodiments the commands, which may be considered a script in various embodiments, are provided to the game device by the server. In some embodiments the commands are provided to the game device as part of provision by the server of the web page to the game device. In some embodiments the commands are provided to the game device after provision by the server of the web page to the game device. In some embodiments the commands are provided to the game device by the server upon receipt of a request for the commands by the game device. In some embodiments the request for the commands by the game device are responsive to receipt of a selection of a check system specifications button on the web page.

In block 315 the process determines if the game device meets predetermined system specifications for play of the downloadable version of the video game. In some embodiments the predetermined system specifications for play of the downloadable version of the video game indicate particular components, for example hardware and/or software items, required to be present on the game device for play of the video game. In some embodiments the predetermined system specification indicate minimum levels regarding components of the game device, for example minimum available cache memory, free space in long term memory, or version levels of software components. In some embodiments the server determines if the game device meets the predetermined system specifications. In some such embodiments, the game device may transmit the information of the game device system specifications to the server so that the server may make the determination. In some embodiments the game device may determine if the game device meets the predetermined system specifications. In some such embodiments, the server may transmit the predetermined system specifications to the game device so that the game device may make the determination. The predetermined system specifications may be transmitted to the game device as part of provision to the game device of the web page, for example, or as part of provision to the game device of the commands that provide system specification information.

If the game device meets the predetermined system specifications for the downloadable version of the video game, the process goes to block 317, otherwise the process goes to block 321.

In block 317, the process determines if a game acquisition request has been made by the game device for acquisition of the downloadable version of the video game. In some embodiments the game acquisition request is transmitted from the game device to the server, for example responsive to selection of a game acquisition button on the web page, and the server determines the game acquisition request has been made responsive to receipt of the request. In some embodiments the game acquisition request includes additional information, for example relating to provision of funds or other matters for acquisition for play of the downloadable version of the video game. If the game acquisition request has been made, the process provides for game play of the downloadable version of the video game in block 319, for example by downloading the downloadable version of the video game to the game device. If the game acquisition request is not made, or if download of the downloadable version of the video game is complete, the process returns.

In block 321 the process determines if the game device meets predetermined system specifications for play of a streaming version of the video game. As with the predetermined system specifications for play of the downloadable version of the video game, in some embodiments the predetermined system specifications for play of the streaming version of the video game indicate particular components, for example hardware and/or software items, required to be present on the game device for play of the video game. In general, one, some, or all of the predetermined system specifications for play of the streaming version of the video game are less stringent than for play of the downloadable version of the video game, such that less capable game devices may be able to provide for play of the streaming version than the downloadable version of the video game. Also as for the downloadable version of the video game, in some embodiments the server determines if the game device meets the predetermined system specifications, and the game device may transmit the information of the game device system specifications to the server so that the server may make the determination. In some embodiments the game device may determine if the game device meets the predetermined system specifications, and the server may transmit the predetermined system specifications to the game device so that the game device may make the determination. The predetermined system specifications may be transmitted to the game device as part of provision to the game device of the web page, for example, or as part of provision to the game device of the commands that provide system specification information, or responsive to the determination that the game device does not meet the predetermined system specifications for the downloadable version of the game.

If the game device meets the predetermined system specifications for the streaming version of the game, the process goes to block 323, otherwise the process returns.

In block 323, the process determines if a game stream request has been made by the game device for play of the streaming version of the video game. In some embodiments the request is transmitted from the game device to the server, for example responsive to selection of a stream game button on the web page, and the server determines the game stream request has been made responsive to receipt of the request. In some embodiments the game stream request includes additional information, for example relating to provision of funds or other matters for acquisition for play of the streaming version of the video game. If the game stream request has been made, the process provides, for example using a game server, for play of the streaming version of the video game in block 325. The process thereafter returns, as does the process if the game stream request is not made.

Figure 4:
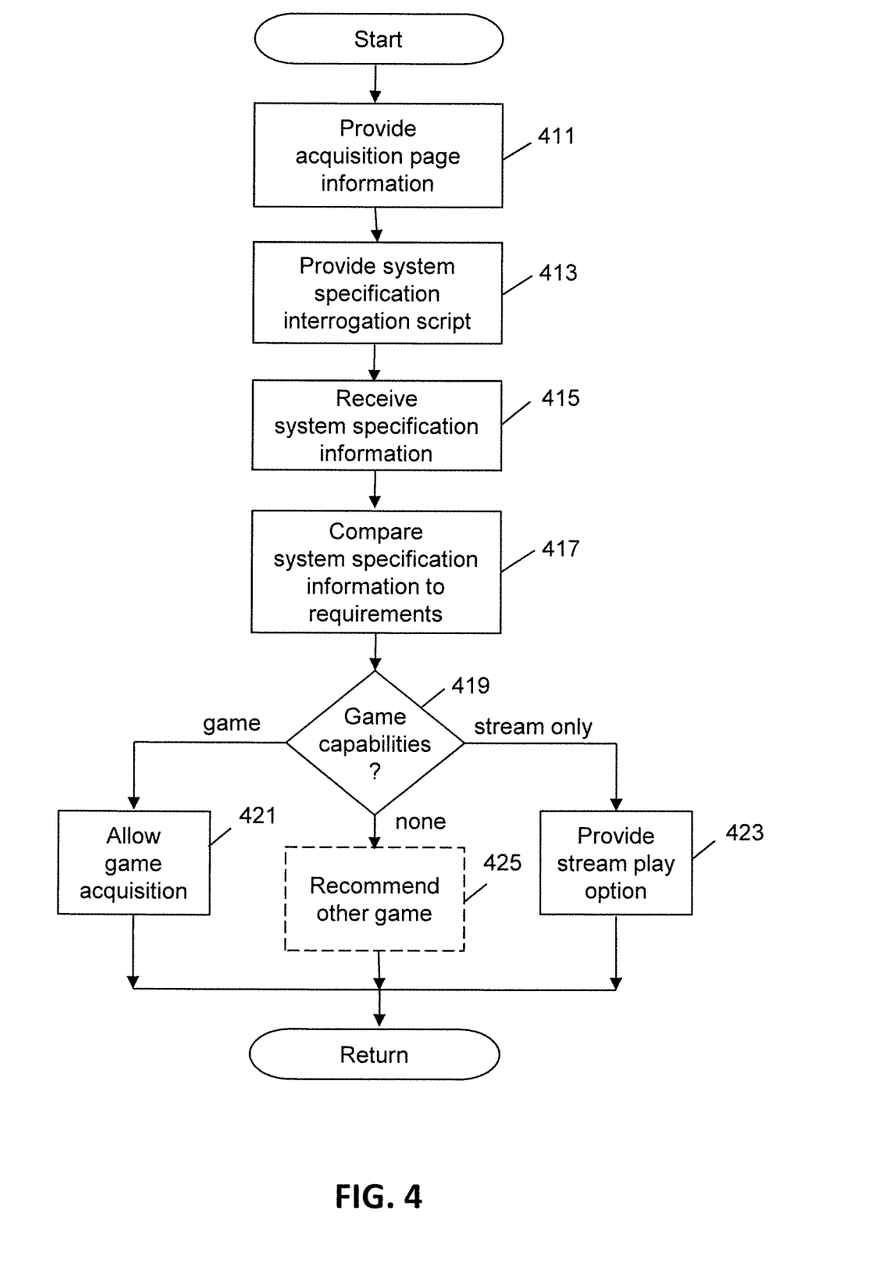
FIG. 4 is a flow diagram of a process for determining a video game to make available to a game device based on game device capabilities, in accordance with aspects of the invention.

FIG. 4 is a flow diagram of a process for determining a video game to make available to a game device based on game device capabilities, in accordance with aspects of the invention. In some embodiments the process is performed by a system, such as the system of FIG. 1. In some embodiments the process, or part of the process, is performed by a server, for example the server of FIG. 1. In some embodiments the process is performed by a server and a game device, for example the server of FIG. 1 and one of the game devices of FIG. 1. In some embodiments the process is performed by one or more processors, for example configured by program instructions.

In block 411 the process provides information of a transactional web page for procurement of a downloadable video game. In some embodiments the information is provided by the server to the game device. In some embodiments the server provides a web-based store. In some embodiments the server is a game server. In some embodiments the web page is the web page of FIG. 2A, or a variation of the web page of FIG. 2A.

In block 413 the process provides a system specification interrogation script. In some embodiments the script is provided by the server to the game device. In some embodiments the script includes one or more commands that, when executed by the game device, provide information regarding system specifications of the game device. In some embodiments the system specification information includes one, some, or all of information as to a processor of the game device, cache memory of the game device, non-volatile, non-cache free memory of the game device, API library information for the game device, video related capability of the game device, sound related capability of the game device, and/or Internet bandwidth for the game device.

In block 415 the process receives system specification information for the game device. In some embodiments the information is received by the server, for example after transmission of the information from the game device to the server. In some embodiments the script includes one or more commands for the game device to transmit the information to the server.

In block 417 the process compares the system specification information to one or more sets of requirements related to video game play by the game device. In some embodiments the server compares the system specification information to the one or more sets of requirements. In some embodiments the one or more sets of requirements include a set of requirements for play of a downloadable version of a video game by the game device. In some embodiments the one or more sets of requirements include, additionally include in some embodiments, a set of requirements for play of a streaming version of the video game by the game device.

Figure 5:
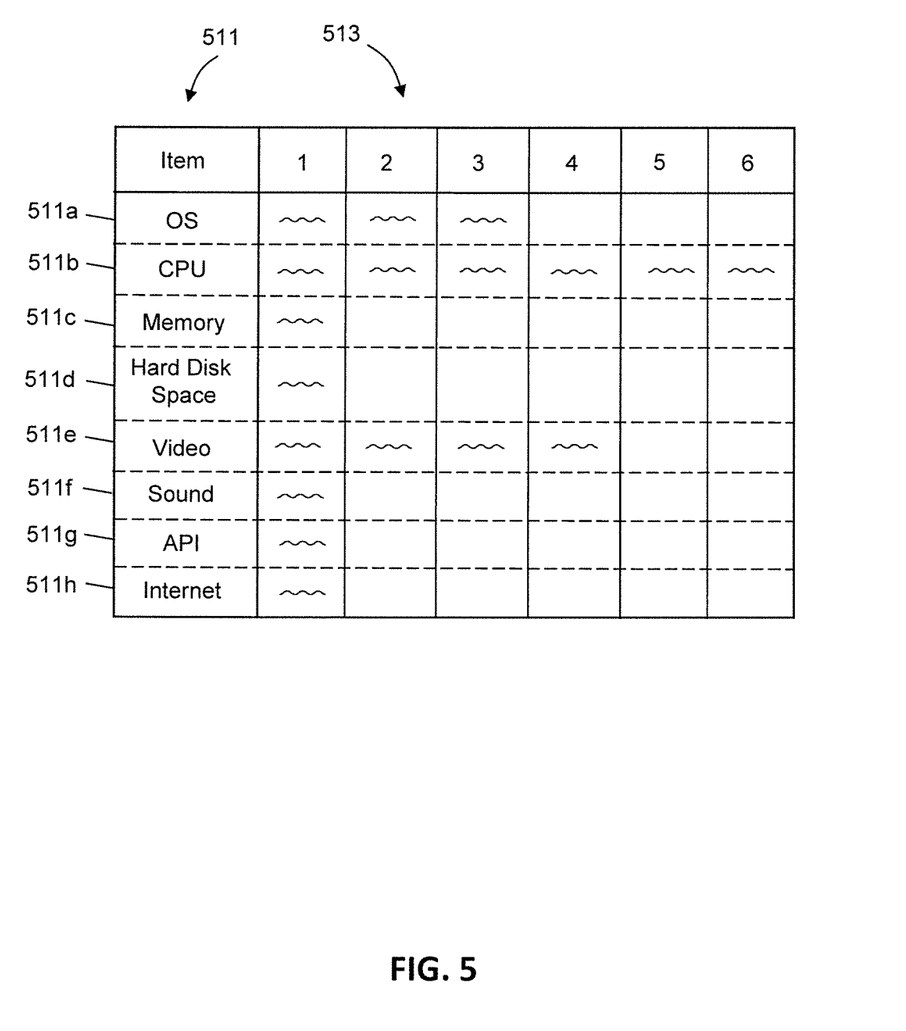
FIG. 5 diagrammatically illustrates records of a table for use in determining whether a game device meets system requirements for play of a video game, in accordance with aspects of the invention.

In some embodiments the server may maintain the sets of requirements in records, for example in records of a table or database. FIG. 5 diagrammatically illustrates records of a table for use in determining whether a game device meets system requirements for play of a video game, in accordance with aspects of the invention. The table of FIG. 5 may be for requirements for a game device to be able to play a downloadable video game, for example. The table of FIG. 5 includes a plurality of items 511 for which there is a requirement for a game device to meet to be able to play the video game. The items in FIG. 5 include a required operating system (OS) 511a, a required processor (CPU) 511b, a required amount of cache or on-board memory 511c, a required amount of free disk space 511, a required video device 511e, a required sound device 511f, a required API library 511g, and a required Internet connection available bandwidth 511h. In various embodiments the required items may differ.

The table of FIG. 5 also includes a plurality of records 513 indicating the requirements for each required item. For some items, for example operating system or processor, any of a plurality of items may meet the requirement. For example, any of a plurality of listed operating systems may be used for play of some video games, and any of a plurality of listed processors may be used for play of those video games. For some items, for example memory or available hard-disk space, a minimum amount may be listed, and presence of that amount or a greater amount may be required for play of the video game.

Returning to FIG. 4, in block 419 the process determines the video game capabilities of the game device, based on the system specifications for the game device and the one or more sets of system requirements. If the process determines the game device meets the requirements for play of the downloadable version of the video game, then the process goes to block 421 and allows the game device to acquire the downloadable version of the video game. If the process determines the game device instead only meets the generally lower requirements for play of the streaming version of the video game, then the process goes to block 423 and provides an option to the game device for play of the streaming version of the video game. If the game device meets neither of the requirements for play of the downloadable or streaming versions of the video game, the process may go to block 425. In block 425 the process may recommend some other video game, which the game device may be able to play. In doing so, the process may include information regarding similar video games, or video games which provide similar experiences, or video games which share a common user base, to the video game which the game device has been determined to be unable to play.

The process thereafter returns.

Although the invention has been discussed with respect to various embodiments, it should be recognized that the invention comprises the novel and non-obvious claims supported by this disclosure.

What is claimed is:

1. A method, performed at least in part by a server, of making an appropriate version of a video game available for play using a game device, comprising:
  receiving a request for a transactional web page for procurement of a downloadable version of the video game;
  providing information of the transactional web page for procurement of the downloadable version of the video game to the game device, the transactional web page for procurement of the downloadable version of the video game including a script for interrogation of the game device system specifications;
  receiving results of execution of the script on the game device;
  responsive to receiving the results, comparing the results of execution of the script with predetermined system requirements for execution of the downloadable video game;

determining that the comparison of the results of execution of the script and the predetermined system requirements indicates the game device is not suitable for play of the downloadable version of the video game; and in response to at least determining that the comparison of the results of execution of the script and the predetermined system requirements indicates the game device is not suitable for play of the downloadable version of the video game, providing, to the game device, an option to engage in play of a streaming version of the video game.

2. The method of claim 1, wherein the option to engage in play of the streaming version of the video game comprises a combined option to procure a right to engage in play of the streaming version of the video game and to begin streaming play of the streaming version of the video game.

3. The method of claim 1, further comprising determining that the comparison of the results of execution of the script and the predetermined system requirements indicates the game device is suitable for play of the streaming version of the video game.

4. The method of claim 3, wherein provision, to the game device, of the option to engage in play of the streaming version of the video game is additionally in response to at least determining that the comparison of the results of execution of the script and the predetermined system requirements indicates the game device is suitable for play of the streaming version of the video game.

5. The method of claim 1, further comprising providing, to the game device, a notification that the game device is not suitable for play of the downloadable version of the video game.

6. The method of claim 1, wherein the predetermined system requirements include operating system requirements, processor requirements, memory requirements, and application programming interface requirements.

7. The method of claim 6, wherein the predetermined system requirements specify a plurality of items which meet a particular first one of the predetermined system requirements and a minimum value which must be met or exceeded to meet a particular second one of the predetermined system requirements.

8. A server coupled to a network, the server for providing an appropriate version of a video game available for play using a game device, the server comprising:
at least one processor, the at least one processor configured by program instructions to:

provide information of a transactional web page for procurement of a downloadable version of the video game to the game device in response to receipt of a request for the transactional web page for procurement of the downloadable version of the video game, provide, to the game device, a script for use in interrogation of the game device system specifications, compare results of execution of the script with predetermined system requirements for execution of the downloadable video game, determine whether the comparison of the results of execution of the script and the predetermined system requirements indicates the game device is or is not suitable for play of the downloadable version of the video game, and provide, to the game device, an option to engage in play of a streaming version of the video game in the event that the comparison of the results of execution of the script and the predetermined system requirements indicates the game device is not suitable for play of the downloadable version of the video game.

9. The server of claim 8, wherein the processor is configured by program instructions to provide the script to the game device as part of providing the information of the transactional web page for procurement of the downloadable version of the video game to the game device.

10. The server of claim 8, wherein the information of the transactional web page for procurement of the downloadable version of the video game includes an option to request checking whether the game device meets predetermined system requirements for play of the downloadable version of the video game.

11. The server of claim 8, wherein the processor is additionally configured by program instructions to compare results of execution of the script with predetermined system requirements for play of a streaming version of the video game.

12. The server of claim 11, wherein the processor is additionally configured by program instructions to provide, to the game device, the option to engage in play of the streaming version of the video game only if comparison of the results of execution of the script with the predetermined system requirements for play of the streaming version of the video game indicates that the game device meets or exceeds the predetermined system requirements for play of the streaming version of the video game.

\* \* \* \* \*